United States Patent [19]
Renner et al.

[11] Patent Number: 4,686,644
[45] Date of Patent: Aug. 11, 1987

[54] LINEAR PREDICTIVE CODING TECHNIQUE WITH SYMMETRICAL CALCULATION OF Y-AND B-VALUES

[75] Inventors: Karl H. Renner, Dallas; Alec J. Morton, Plano, both of Tex.

[73] Assignee: Texas Instruments Incorporated, Dallas, Tex.

[21] Appl. No.: 646,606

[22] Filed: Aug. 31, 1984

[51] Int. Cl.$^4$ .......................... G06F 15/31; G10L 1/00
[52] U.S. Cl. ....................................... 364/724; 381/51
[58] Field of Search .................... 364/724, 760; 381/51

[56] References Cited

U.S. PATENT DOCUMENTS

| | | | |
|---|---|---|---|
| 4,209,844 | 6/1980 | Brantingham et al. | 364/724 |
| 4,319,084 | 3/1982 | Lucchini et al. | 381/51 |
| 4,340,781 | 7/1982 | Ichikawa et al. | 364/724 |
| 4,344,148 | 8/1982 | Brantingham et al. | 364/724 |
| 4,352,162 | 9/1982 | Nyuji et al. | 364/724 |
| 4,392,018 | 7/1983 | Fette | 381/51 |
| 4,398,262 | 8/1983 | Williams | 364/724 |
| 4,443,859 | 4/1984 | Wiggins | 364/724 |
| 4,554,858 | 11/1985 | Wachi et al. | 364/724 |
| 4,597,053 | 6/1986 | Chamberlin | 364/760 |

FOREIGN PATENT DOCUMENTS

| | | | |
|---|---|---|---|
| 2103458 | 2/1983 | United Kingdom | 381/51 |

*Primary Examiner*—David H. Malzahn
*Attorney, Agent, or Firm*—Leo N. Heiting; Melvin Sharp

[57] ABSTRACT

A digital lattice filter includes a Y-adder (44) and a B-adder (106). The Y-adder (44) calculates the Y-values for a linear predictive coding voice compression technique and the B-adder (106) calculates the B-values. Each of the calculated B-values output by the B-adder (106) is input to a B-stack (118) for storage therein. The B-stack (118) delays the B-values for one sample period. Multiplier constants are contained in a K-stack (90) for output to both adders (44) and (106) for use in the multiplication operation. The final value is stored in a Y1-register (104). Each of the adders (44) and (106) are multiplexed to perform a multiplication operation followed by an addition operation to generate the respective Y- and B-values. A generated Y-value is stored in a Y-register (56) for use in the next sequential Y calculation. In addition, the generated Y-value is used as a multiplicand for generation of a B-value. Therefore, it is only necessary to store the Y-values for one clock cycle and the B-values for up to nine clock cycles, thus reducing the amount of storage space necessary. In addition, the use of two multiplexed adders reduces the required processing speed at each of the adders.

18 Claims, 5 Drawing Figures

LINEAR PREDICTIVE CODING TECHNIQUE WITH SYMMETRICAL CALCULATION OF Y-AND B-VALUES

TECHNICAL FIELD OF THE INVENTION

The present invention pertains in general to speech synthesis and, more particularly, to the technique of voice compression utilizing linear predictive coding with a digital lattice filter.

CROSS REFERENCE TO RELATED APPLICATIONS

This application is related to patent application Ser. No. 646,868, patent application Ser. No. 646,381, patent application Ser. No. 646,869, and patent application Ser. No. 646,401.

BACKGROUND OF THE INVENTION

Generation of complex synthesized sounds such as speech requires some form of voice compression. One voice compression technique that has been heretofore utilized is linear predictive coding (LPC). LPC utilizes a digital lattice filter to model human speech from a set of prestored input parameters contained in a Read Only Memory (ROM). The LPC lattice filter typically is comprised of ten stages with each stage requiring two multiplications and two additions before passing the results backwards and forwards to its neighboring stages. The operations in the ten stages are carried out sequentially, as are the four operations within each stage. Processing of each prestored input parameter through the lattice filter results in a digital output value which is converted to an analog signal level and then amplified for output to a speaker or similar transducer.

In order to synthesize high quality speech with a digital lattice filter, it is necessary to process the prestored input parameters through the lattice filter at a repetition rate of approximately 10 kHz. To operate the lattice filter at this repetition rate, each stage must perform the digital operations therein within ten microseconds. The digital addition and/or subtraction operations required for each stage utilize a relatively straightforward process, whereas the digital multiplication operation is somewhat more complicated. Multiplication of two binary values requires iterative processing which may require up to four separate additions to yield a product, depending upon the length of the digital values multiplied. The processing of the two multiplications and two additions for each stage can therefore require the generation of up to ten separate sums.

Heretofore, the two multiplications and two additions for each stage have been performed in a parallel fashion with five sums being simultaneously generated in a pipeline fashion. In this manner, circuitry with a relatively slow response time can be utilized. However, to perform this parallel operation, five full adders are required resulting in a large parts count. This large parts count requires a significant amount of silicon surface area in order to realize the circuitry for the five full adders and the peripheral control circuitry necessary to support this number of full adders. From a cost and manufacturing standpoint, it would be desirable to utilize less circuitry to perform the same operation. Therefore, there exists a need for a circuit to process the multiplications and additions/subtractions required in each stage of the digital filter that is reliable and utilizes less circuitry without sacrificing processing time.

SUMMARY OF THE INVENTION

The invention disclosed and claimed herein comprises a digital lattice filter for calculating Y-values and B-values for a linear predictive coding voice compression technique. The filter includes a multiplier storage register for storing multiplier constants in a predetermined order, a delay stack for storing and delaying B-values and a temporary storage register for storing calculated Y-values for use in the next subsequent calculation. Y-values are calculated with a first circuit that receives a multiplier from the multiplier storage register, a multiplicand from the delay register and the previously calculated Y-value from the temporary register. Utilizing this data, a Y-value is calculated and output for storage in the temporary storage register. B-values are calculated with a second circuit that receives a multiplier from the multiplier storage register, a multiplicand from the output of the Y-value calculation circuit and an addend from the delay stack. Utilizing these parameters, a B-value is calculated and stored in the bottom of the delay register. The Y- and B-value calculation circuits operate simultaneously such that both values are being generated at the same time. A control circuit is provided for controlling the operation of the digital lattice filter to sequentially calculate the Y- and B-values in a predetermined amount of time and also determine the amount of time that the B-values are delayed through the delay stack. The final calculated Y-value is stored in a latch.

The Y- and B-value calculation circuits both comprise a single full adder that has the operation thereof multiplexed to perform a multiplication operation on the multiplicand and multiplier followed by the addition of an addend with the generated product. The multiplication operation is an iterative multiplication operation utilizing a modified Booth's algorithm. This iterative operation requires generation of partial products of the multiplicand and multiplier and the addition of these partial products with the addend.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figures 1, 2:
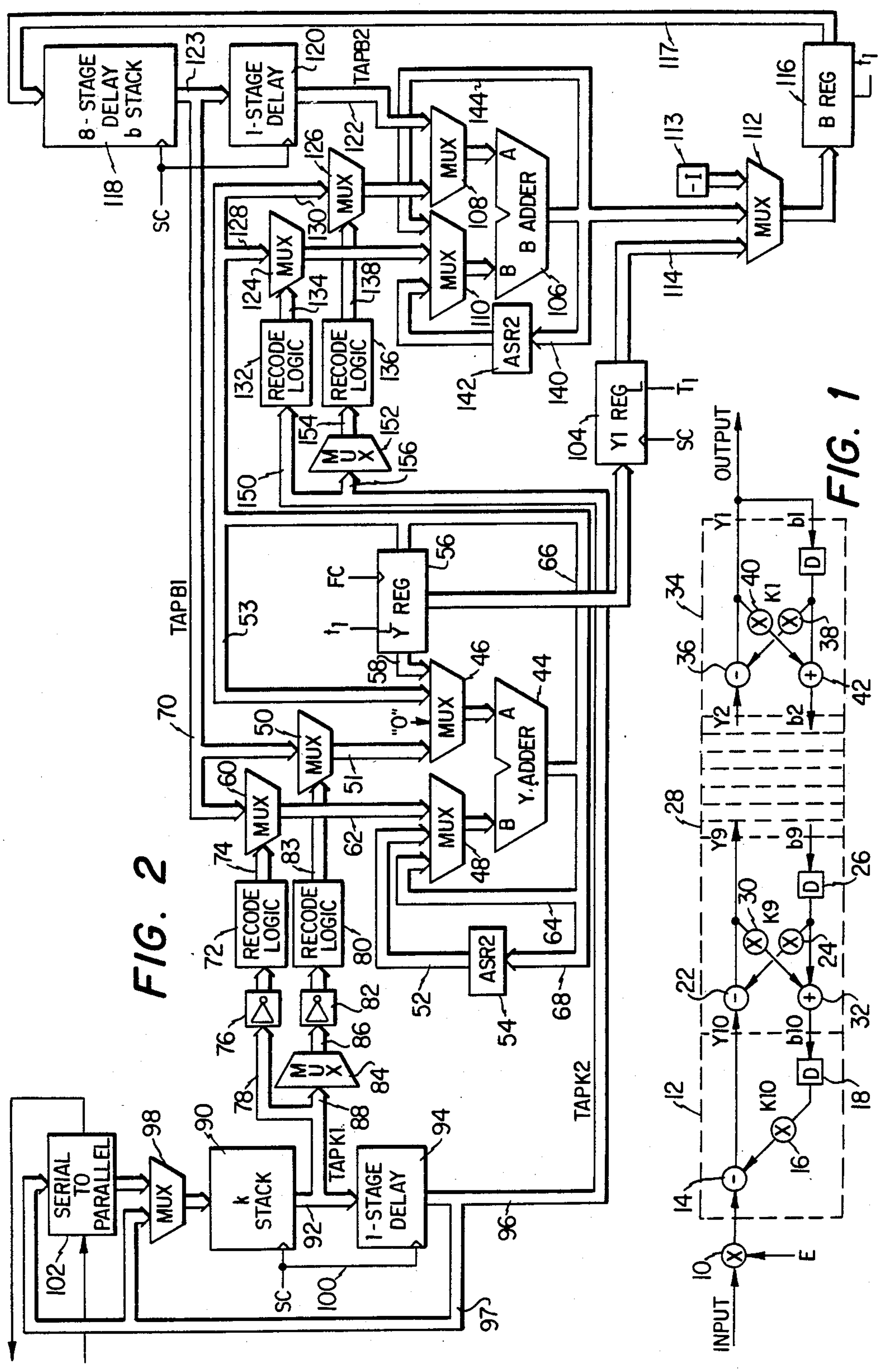
FIG. 1 illustrates a functional block diagram of a ten stage digital filter for processing of the lattice equations.
FIG. 2 illustrates a schematic diagram of the system for multiplexing two symmetrical adders to process the lattice equations.

Speech synthesis utilizing a ten stage lattice filter requires processing of a prestored speech parameter through all ten stages of the lattice filter within a predetermined duration of time. Each stage of the lattice filter has two sets of equations, one for generating the "Y"

value and the other for calculating the reflection coefficient or "B" value. Both the Y- and B-values are calculated with equations consisting of one multiplication step followed by an addition or subtraction step. There are twenty separate equations required to calculate all of the Y- and B-values, each equation depending upon the results from a previous equation. These equations are illustrated in Table 1.

TABLE 1

| | |
|---|---|
| $Y10_i = EI_i - k10b10_{i-1}$ | (1) |
| $Y9_i = Y10_i - k9b9_{i-1}$ | (2) |
| $Y8_i = Y9_i - k8b8_{i-1}$ | (3) |
| $Y7_i = Y8_i - k7b7_{i-1}$ | (4) |
| $Y6_i = Y7_i - k6b6_{i-1}$ | (5) |
| $Y5_i = Y6_i - k5b5_{i-1}$ | (6) |
| $Y4_i = Y5_i - k4b4_{i-1}$ | (7) |
| $Y3_i = Y4_i - k3b3_{i-1}$ | (8) |
| $Y2_i = Y3_i - k2b2_{i-1}$ | (9) |
| $Y1_i = Y2_i - k1b1_{i-1}$ | (10) |
| $b10_i = b9_i + k9Y9_{i-1}$ | (11) |
| $b9_i = b8_{i-1} + k8Y8_i$ | (12) |
| $b8_i = b7_{i-1} + k7Y7_i$ | (13) |
| $b7_i = b6_{i-1} + k6Y6_i$ | (14) |
| $b6_i = b5_{i-1} + k5Y5_i$ | (15) |
| $b5_i = b4_{i-1} + k4Y4_i$ | (16) |
| $b4_i = b3_{i-1} + k3Y3_i$ | (17) |
| $b3_i = b2_{i-1} + k2Y2_i$ | (18) |
| $b2_i = b1_{i-1} + k1Y1_i$ | (19) |
| $b1_i = Y1_i$ | (20) |

The input energy level is represented by "E" and this is generated either internally from prestored parameters or from an external source. A term "$I_i$" represents an input excitation value which is representative of either random noise that is utilized in the generation of hissing sounds that are made by the spoken voice or periodic voiced sounds. A number of constants are provided that are prestored and labeled k1 through k10. The constants k1–k10 describe the characteristics of the equations that correspond to the shape of the mouth and the position of the tongue and teeth in order to allow generation of the various sounds corresponding to speech. The B-values are labeled b1 through b10 and are generated in a previous sample time. These previously calculated B-values are utilized to sequentially calculate the Y-values labeled Y1 through Y10. The sample time is the duration of time required to process the twenty equations and generate the value of Y1. The values generated during a given sample time are referred to as the "i'th" values with the values calculated in the prior sample time referred to as the "i-1" values.

Initially, the value for $\mathbf{Y10}_i$ is calculated according to Equation 1 utilizing the product of the input energy level I and the excitation energy E, the value of the constant k10 and the previously calculated value of b10. The previously calculated value for b10 is represented by the subscript "i−1". Values for $\mathbf{Y9}_i$ through $\mathbf{Y1}_i$ are then calculated according to Equations 2–10 with $\mathbf{Y1}_i$ being equal to the final result for the i'th sample time. The B-values are then calculated according to Equations 11–20 by utilizing both the calculated $\mathbf{Y1}_i$ through $\mathbf{Y10}_i$ values and the previously calculated $\mathbf{b1}_{i-1}$ through $\mathbf{b9}_{i-1}$ values. These new B-values are stored for use in calculation of the Y-values during the next sequential sample time. The operation of linear predictive coding is described in more detail in "Three-chip System Synthesizes Human Speech", Richard Wiggins and Larry Brautingham, *Electronics*, Aug. 31, 1978, pp. 109–116.

Referring now to FIG. 1, there is illustrated a functional block diagram of a 10-stage lattice filter for processing the twenty equations in Table 1. The input energy E is input to a multiplication block 10 which also receives the excitation energy I to generate a product EI therefor. This product EI is input to a first stage 12 of the digital lattice filter to a subtraction block 14. The subtraction block 14 subtracts the product EI from a product generated by a multiplication block 16. The multiplication block 16 receives the delayed value of b10 which is delayed through a delay block 18 and multiplies it by the constant k10 to provide the product $\mathbf{k10b10}_{i-1}$. The output of the subtraction block 14 is labeled Y10 which is input to a second stage 20 of the digital filter to a subtraction block 22. The subtraction block 22 receives a product from a multiplication block 24 which is the product of k9 and the delayed value of b9. The value of b9 is delayed through a delay block 26. The output of the subtraction block 22 is the value Y9 which is input to a third stage 28 of the digital filter.

The generated Y9 value is input to a multiplication block 30 in the third stage 28 for multiplication by the constant k9 and then summed with the delayed value of b9 in a summation block 32. This summation block outputs the value of b10 which is then input to the delay block 18. The delay block 18 represents a delay for one complete sample period.

The third stage 28 performs a similar calculation as that performed in the second stage 20 except that it utilizes the constant k8. Subsequent stages calculate the values Y8 through Y2 with a final tenth stage 34 calculating the Y1 value for output from the digital filter. The tenth stage 34 receives the Y2 value at the input of a subtraction block 36 to subtract it from the product output by a multiplication block 38. The product generated by the multiplication block 38 is the product of the delayed value b1 and the constant k1. In addition, Y1 is input to a multiplication block 40 for multiplication by the constant k1, the product thereof input to an addition block 42 for addition with the delayed value of b1. The output is the value b2.

In order to process the input energy I through the ten stage lattice filter, it is necessary to process the Equations 1–20 individually and in a predetermined manner. If the equations are processed according to the order in Table 1, it is first necessary to calculate the Y-values using B-values from a preceding sample period. These B-values are stored for the duration of the previous sample period and then retrieved during processing of the Y-values. After processing of the Y-values, the B-values are then calculated using these Y-values. Therefore, the Y-values must be stored during a given sample time for use in calculating the B-values therein. Calculation of the equations in accordance with the order of Table 1 requires sufficient memory to delay calculated B-values until a subsequent sample period for calculation of the Y-values and to store the Y-values for use in subsequent equations within a given sample period.

One technique of processing the equations is described in co-pending patent application Ser. No. 646,868, wherein a single full adder is multiplexed to perform both the addition and subtraction operations with two delay data registers provided for storage of intermediate results. One of the data registers is utilized to delay all of the Y- and B-values for use in calculating subsequent equations and a second delay register is utilized to delay the B-values only for use in the next sample period. However, this requires a large number of shift registers for providing the delay. In accordance with the present invention, two full adders are utilized with the operation of each of the full adders multiplexed to perform both multiplication and addition/subtraction steps for a given equation. One of the adders is dedicated to calculating Y-values and one of the adders is dedicated to calculating B-values. In so doing, no storage registers are required for the Y-values and only one set of storage registers is required to delay the B-values from one sample period to the next. This delay register is only nine stages deep, thus significantly reducing the number of storage devices required. In addition, each of the adders can be operated at a slower speed to reduce circuitry requirements for each of the individual adders.

Referring now to FIG. 2, there is illustrated a schematic block diagram of the system in accordance with the present invention for processing Equations 1–20 of Table 1 with two multiplexed adders. A full adder 44 is provided with two inputs and one output for receiving two digital values and generating the sum therefor. The adder 44 is utilized to output the Y-values. The Y-adder 44 is multiplexed to perform both a multiplication operation and an addition operation. The product of the multiplication operation is added to an addend to generate the final sum which is the result for a given Y-value in accordance with Equations 1–10 in Table 1. The adder 44 has one input labeled "A" and one input labeled "B". The A-input thereof is connected to the output of a multiplexer 46 and the B-input thereof is connected to the output of a multiplexer 48. The multiplexer 46 has four inputs thereto. One input is connected to the output of a multiplexer 50, one input thereof is connected to a data bus 53 that is connected to the output of the Y-adder 44, one input thereof is connected to the output of a Y-register 56 through a data bus 58, and the remaining output is connected to a 0" value digital word wherein all of the digits therein are equal to a logic "0". The multiplexer 48 has three inputs, one of which is connected to the output of a multiplexer 60 through a data bus 62, one of which is connected to the output of the Y-adder 44 through a fifteen-bit wide data bus 64 and the remaining one of which is connected to the output of the adder 44 through a shifting block 54 through a bus 52.

The input of the Y-register 56 is connected to the output of the Y-adder 44 through a fifteen-bit wide data bus 66. The shifting block 54 is also connected to the data bus 66 through a fifteen-bit interconnect bus 68.

The output of multiplexers 50 and 60 are each connected to a fifteen-bit wide bus 70 for receiving multiplicands. The multiplexers 50 and 60 are operable to generate partial products for the multiplication operation, as will be described hereinbelow. The partial products generated by the multiplexer 60 are controlled by a recode logic circuit 72 which is connected to the multiplexer 60 through a data bus 74. The input of the recode logic circuit 72 is connected to the output of an inverter bank 76 to invert data received from a two-bit wide data bus 78. The multiplexer 50 receives control data from a recode logic circuit 80 through a data bus 83. The input of the recode logic circuit 80 is connected to the output of an inverter bank 82 which has the input thereof connected to the output of a multiplexer 84 through a two-bit wide data bus 86. The input of the multiplexer is connected to a data bus 88.

The recode logic circuits 72 and 80 are operable to receive select bits from a ten-bit wide multiplier word and generate control signals for the multiplexers 50 and 60 to generate partial products. The multiplier words are stored in a eleven-stage rotary data register 90, referred to hereinafter as the "K-stack". The output of the K-stack 90 is connected to a ten-bit wide data bus 92. The data bus 78 is connected to the first two bits of the data bus 92 and the data bus 88 is connected to the remaining 8 bits thereof. Therefore, the data bus 78 contains the least two significant bits and the data bus 88 contains the 8 most significant bits of the ten-bit wide multiplier word. The interconnection between the data bus 92 and both the data buses 78 and 88 is referred to as "TAP K1".

The ten-bit wide data bus 92 is also connected to the input of a one-stage data register 94, the output of which is connected to a ten-bit wide data bus 96. The data bus 96 is labeled "TAP K2". In addition, the output of the one-stage register 94 is also connected to the input of a multiplexer 98 through a feedback data bus 97, the output of which is connected to the input of the K-stack 90. When the multiplexer 98 is controlled to input the data on the feedback data bus 97 to the K-stack 90, the K-stack 90 and the one-stage data register 94 constitute a circulating data register in which eleven ten bit wide data words are stored and circulated therethrough under control of a clock signal on clock line 100. The clock line 100 is connected to an external signal labeled "SC" representing a slow clock signal. The operation of a slow clock signal will be described in more detail hereinbelow.

The multiplexer 98 has two inputs, one input of which is connected to the ten-bit wide feedback data bus 97 and the other input of which is connected to the output of a serial-to-parallel converter 102. The serial-to-parallel converter 102 has the parallel input thereof also connected to the feedback data bus 97 for receiving data therefrom. The serial-to-parallel converter 102 has serial inputs and outputs that are interconnected with an external source to allow data to be input thereto or received therefrom. The serial-to-parallel converter 102 allows alteration of the data in the K-stack 90 under control of the multiplexer 98.

In addition to having the output fed back to multiplexed inputs, the Y-adder 44 also has the output thereof connected to the input of a Y1-register 104 through the Y-register 56 for storing the results therein. As will be described hereinbelow, the Y1-register 104 holds the results for Y1 for output to a digital to analog convertor (D/A) (not shown). The Y-adder 44 is therefore utilized to perform multiplication and addition operations for Equations 1–10 for the Y-values.

A second adder 106 is termed the B-adder and is utilized to perform similar calculation on the B-values in accordance with Equations 11–20 in Table 1. These equations require as parameters the calculated Y-values and also the delayed B-values that were calculated in a previous sample period. The B-adder 106 has an "A" input and a "B" input for receiving data and generating the sum therefor. The A-input of the adder 106 is connected to the output of a multiplexer 108 and the B-input of the multiplexer is connected to the output of a multiplexer 110. The multiplexers 108 and 110 are similar in operation to the multiplexers 46 and 48 that are connected to the Y-adder 44.

The output of the B-adder 106 is connected to one input of an output multiplexer 112. The multiplexer 112 has two remaining inputs, one of which is connected to the output of the Y-register 104 through a data bus 114 and the other of which is connected to a block 113 labeled "−I". The value of −I is received from an external source (not shown) for inputting input excitation values. The output of the multiplexer 112 is connected to the input of a B-register 116, the output of which is connected to the input of an eight stage data register 118, hereinafter referred to as the "B-stack". The B-stack 118 is a first-in first-out data stack which is clocked by the SC signal. The output of the B-stack 118 is connected to the input of a one-stage delay register 120, the output of which is connected to a data bus 122. The B-stack 118 is connected to the input of the delay register 120 by an interconnect bus 123. The interconnect bus 123 is connected to the data bus 70 which, as described above, is labeled TAP B1, and the data bus 122 is labeled TAP B2. With use of the B-stack 118 in the delay register 120, a total of eight clock cycles of the SC clock are required to clock data output by the B-register 116 to TAP B1 and nine clock cycles of the SC clock are required to clock data from the B-register 116 through the B-stack 118 and the delay register 120 to TAP B2.

As described above, the data output on TAP B1 is utilized as the multiplicand for calculation of Y-values with the adder 44. The multiplicand for calculation of B-values is the calculated Y-values output by the Y-adder 44. These are input to a multiplexer 124 and a multiplexer 126 on data buses 128 and 130, respectively. The data buses 128 and 130 are connected to the data bus 66. The multiplexers 124 and 126 are similar in operation to multiplexers 50 and 60 in that they generate partial products, with multiplexer 126 generating the first partial products and the multiplexer 124 generating the remaining partial products.

The control input of the multiplexer 124 is connected to a recode logic circuit 132 through a data bus 134 and the control input of the multiplexer 126 is connected to a recode logic circuit 136 through a data bus 138. The output of the multiplexer 126 is input to one input of the multiplexer 108 and the output of the multiplexer 124 is input to one input of the multiplexer 110. The other input of the multiplexer 110 is connected to the output of the B-adder 106 through a fifteen bit wide data bus 140 through a shifting block 142 labeled "ASR2". A data bus 144 directly connects the output of the B-adder 106 to one input of the multiplexer 110.

The multiplexer 108 has two remaining inputs, one of which is connected to the data bus 122 labeled TAP B2 and the other of which is connected to the output of a shift block 142 through a data bus 144. The input of the shift block 142 is connected to the output of the B-adder 106 through a fifteen bit wide data bus 146. The recode logic circuit 132 has the input thereof connected to a two bit wide data bus 150 and the recode logic circuit 136 has the input thereof connected to the output of a multiplexer 152 through a two bit wide data bus 154. The two bit wide data bus 150 and the input of the multiplexer 152 are connected to the output of the one stage register 94 through the data bus 96 labeled TAP K2. The two bit wide data bus 150 is connected to the first two bits of the data bus 96 and the input of the multiplexer 152 is connected through an eight bit wide data bus 156 to the remaining eight bits of the data bus 96. The recode logic circuits 132 and 136 operate similar to the recode logic circuits 72 and 80. However, there are no inversion blocks similar to the inversion blocks 76 and 82. As will be described hereinbelow, this affects the sign of the multiplier which is positive for calculation of B-values.

For the multiplication required in computing the B-values, the multiplicands are the Y-values received from the output of the Y-adder 44. The addends are delayed B-values which are received from the data bus 122 labeled TAP B2. During the multiplication operation, the B-adder 106 requires the generation of four sums to perform an iterative multiplication operation. During the first sum, the first partial product is generated by the multiplexer 126 and the second partial product generated by the multiplexer 124. Selection of the appropriate inputs by the multiplexers 108 and 110 allow summation of these two values. This generated sum is then shifted and input back to the multiplexer 108 for selection thereof for input to the A-input of the adder 106. Simultaneously, the multiplexer 124 generates the third partial product for summing therewith. In the preferred embodiment, a ten bit multiplier is utilized with a modified Booth's algorithm. In this algorithm, five partial products are required for the multiplication operation. Therefore, two additional summations are required to add the fourth and fifth partial products. After the final product is generated, it is fed back into the multiplexer 110 on the feedback bus 140 for summation with the addend selected by the multiplexer 108 from the output of the delay register 120. This output is a B-value and is input back into the input of the B-stack 118 through a data bus 117.

In processing each of the Equations 1–20 in Table 1 with the system of FIG. 2, it is necessary to perform a multiplication followed by an addition or subtraction. Subtraction is facilitated by changing the sign of the multiplier prior to the multiplication step. Since only a single full adder is utilized for calculation of either the Y- or B-values, the operation thereof must be multiplexed during a given sample time. In the preferred embodiment, the multiplication scheme utilized is a modified Booth's algorithm. In this algorithm, it is necessary to analyze the multiplier output from the K-stack 90 by segmenting the multiplier into groups of three bits with one bit overlapping in each group with an implied bit to the right of the least significant bit. Therefore, a ten-bit multiplier will result in five 3-bit groups. Each group corresponds to a partial product with a ten-bit multiplier requiring the generation of five partial products $PP_1$, $PP_2$, $PP_3$, $PP_4$ and $PP_5$. In order to generate these partial products, it is first necessary to determine the "modified Booth operator" to determine the operation that must be performed on a given multiplicand in order to generate the respective partial products. The modified Booth operators are "0""+1", "−1", "+2" and "−2". The presence of a "−" requires the generation of the two's complement of the multiplicand and the presence of a "2" requires shifting of the multiplicand to the left by one bit with a "1" requiring no shift. Therefore, the partial products consist of the multiplicand or its two's complement shifted to the left by a maximum of one place. A modified Booth operates of "0" results in a partial product having all logic lists therein at a logic "0". The modified Booth operations are generated as shown in Table 2.

TABLE 2

| THREE-BIT GROUP | | | |
|---|---|---|---|
| A | B | C | OPERATOR |
| 0 | 0 | 0 | 0 |
| 0 | 0 | 1 | +1 |
| 0 | 1 | 0 | +1 |
| 0 | 1 | 1 | +2 |
| 1 | 0 | 0 | −2 |
| 1 | 0 | 1 | −1 |
| 1 | 1 | 0 | −1 |

TABLE 2-continued

| THREE-BIT GROUP | | | |
|---|---|---|---|
| A | B | C | OPERATOR |
| 1 | 1 | 1 | 0 |

After generation of the partial products, they are sequentially shifted by two places and added to the preceding partial products. This will require the adder to first sum $PP_1$ with $PP_2$ and then sequentially sum $PP_3-PP_4$ with the intermediate products, resulting in four summation operations. After the product has been generated, an additional summation is required to complete of the Equations 1–20 in Table 1 by selecting a delayed B-value from B-stack 118 or a previously calculated Y-value for the addend.

In performing the multiplication operation, as described above, it is necessary to determine the operation that is to be performed on the multiplicand to generate the various partial products. The modified Booth operator for $PP_1$ is determined by a recode logic circuit 80 for the Y-adder 44 which receives the first two bits of the multiplier. Once the modified Booth operator is generated, the multiplexer 50 modifies the multiplicand to generate $PP_1$. For $PP_2-PP_4$, the multiplexer 84 selects the appropriate bits from the remaining eight bits of the multiplier and the recode logic circuit 72 generates a modified Booth operator in response to the selection of bits. This operator then controls the multiplexer 60 to determine the operation that is to be performed on the multiplicand for generating $PP_2-PP_5$.

In performing the multiplication, the multiplexer 46 selects the output of the multiplexer 50 to input $PP_1$ to the A-input of the Y-adder 44 and the multiplexer 48 selects the output of the multiplexer 60 to input the value of $PP_2$ to the B-input of the Y-adder 44. Since four summations are required for the multiplication operation, four clock cycles are generated to perform the multiplication operation. These cycles are referred to as "passes" through Y-adder 44. They are represented by the time periods "$t_1$", "$t_2$", "$t_3$" and "$t_4$". $PP_1$ and $PP_2$ are added during the period $t_1$. During this period, the multiplexer selects the third and fourth bit of the multiplier word. During time period $t_2$, the summation of $PP_1$ and $PP_2$ is input to the A-input of Y-adder 44 through the multiplexer 48 from the data bus 64 during $t_2$. In addition, the fifth and sixth bits of the multiplier word selected by the multiplexer 84 and the modified Booth operator generated for $PP_3$. $PP_3$ is then input to the B-input of the Y-adder 44 with the multiplexer 48. This summation is then input back to the A-input of the Y-adder 44 for summation with $PP_4$ during $t_3$. $PP_5$ is added to this sum during $t_4$, the result being the product.

After the product has been generated, the multiplexer 48 is controlled to select the feedback data bus 64 to input the product into the B-input of the full Y-adder 44. The appropriate addend is then selected with the multiplexer 46. This additional operation is performed during a time period $t_5$ which is equal in duration to each of the time periods $t_1$–$t_4$. Therefore, each period for processing one of the Equations 1–20 in Table 1 is divided into five separate time periods $t_1$–$t_5$. The processing time for each equation is termed a "T-time".

In the present embodiment, the outputs of the Y-adder 44 and the B-adder 106 are, in one mode, circulated back to one of the inputs thereof. Utilization of combinational logic for performing the summations would require some sort of latching the circuit disposed on the adder inputs. In the preferred embodiment, however, dynamic NMOS technology is utilized which does not require an input latch to recirculate data. In dynamic NMOS devices, a four phase clock is utilized with each phase of the clock processing data through the circuit. For example, in a full adder, the first phase of the clock would cause the data to be loaded therein with the result being output from the adder on the fourth phase of the four phase clock. Therefore, the data on the output of the adder that is to be recirculated around to one input need only be there a sufficient amount of time to be loaded into the adder on the first phase of the clock. In a similar manner, loading into the delayed registers is effected on the first phase of a four phase clock. This four phase clock is not illustrated and is an internal clock which is a required part of a dynamic NMOS circuit. As described above, use of conventional combinational logic for the adders would require latched inputs and/or outputs.

Figure 3:
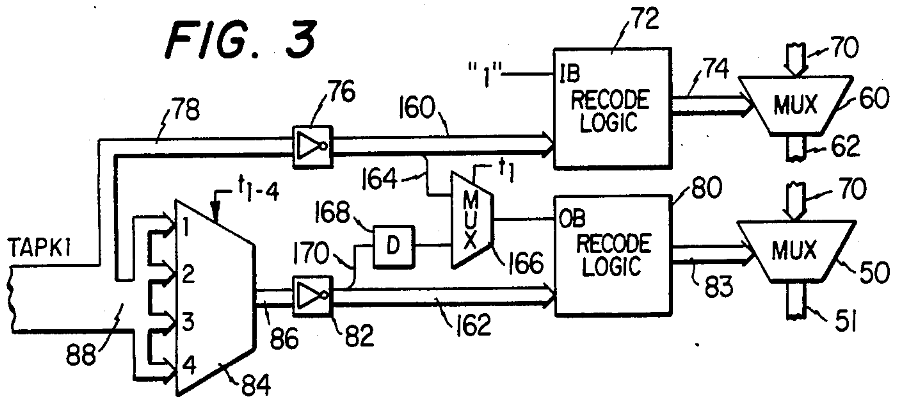
FIG. 3 illustrates a block diagram of the recode logic circuit for generating the modified Booth's operators.

Referring now to FIG. 3, there is illustrated a block diagram of the logic circuitry required for generating the modified Booth operators that determine the operation performed on the multiplicands. Like numerals refer to like parts in the various Figures. For illustrative purposes, only the circuitry utilized in generating modified Booth operators for multiplication with the Y-adder 44 are illustrated. However, it should be understood that similar circuitry is required for generating modified Booth operators for multiplication with the B-adder 106, with the exception that no inversion banks similar to 76 and 82 are required. The inversion banks effectively invert the sign of the resulting product so that the subtraction required in computing the Y-values is implemented.

The output of the inversion block 76 is input to the recode circuit 72 through a two bit wide data bus 160. The inverter bank 76 inverts the data on both lines of the two bit data bus 78 for input to the recode logic circuit 72. The multiplexer 84 is controlled by timing signals $t_1$-$t_4$ to select data off of the eight bit wide data bus 88. The first two bits of the data bus 88 are input to the multiplexer 84 at an input labeled "1", the second two bits are input to an input labeled "2", the third two bits are input to an input labeled "3" and the fourth two bits are input to an input labeled "4". Depending upon which of the timing signals $t_1$-$t_4$ is present, one of these inputs will be output to the data bus 86 for inversion by the inverter 82. The output of the inverter bank 82 is connected to the recode logic circuit 80 through a two bit wide data bus 162.

The recode logic circuit 72 analyzes the first two bits output by the one delay stage register 94 on the data bus 96 that is labeled TAP K2. As described above, for $T_1$ the first three-bit group has an implied bit. This implied bit is "0" for a positive multiplier and "1" for a negative multiplier. For calculation of the Y-values, the implied bit is always a "1" and, therefore, a "1" is input to the implied bit input of the recode logic circuit 72 that is labeled "IB".

In analyzing each of the three bit groups for generation of partial products $PP_2$-$PP_5$, the recode logic circuit 80 analyzes the two bits selected by the multiplexer 84 and the most significant bit of the previous three bit group. For the first pass, the first three bit group was input on the data bus 160 to the recode logic circuit 72. A one bit data line 164 is connected to the most significant bit on the data bus 160 for input to a multiplexer 166. The output of the multiplexer 166 is input to the overflow bit input of the recode logic circuit 80 that is labeled "OB". The remaining two bits of the three-bit group are input on the data bus 162. During subsequent analysis of three-bit groups, the most significant bit is stored in a delay register 168 that is connected through a one-bit line 170 to the most significant bit on the two-bit data bus 162. The output of the delay register 168 is connected to the other input of the multiplexer 166 for input to the overflow bit of the recode logic circuit 80. The multiplexer 166 is controlled to select the data on the one bit data line 164 only during the time period $t_1$. For the remaining time periods during multiplication, the data output by the delay register 168 is selected.

Figure 4:
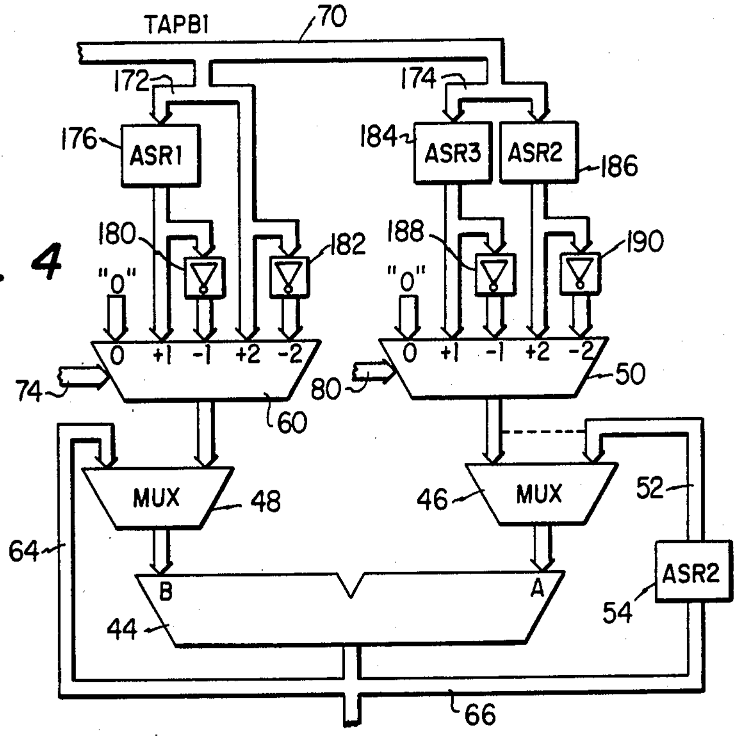
FIG. 4 illustrates a block diagram of the multiplexing circuit for reconfiguring the adder as a multiplier.

Referring now to FIG. 4, there is illustrated a schematic diagram of the Y-adder 44 and the associated multiplexers illustrating the generation of the partial products $PP_1$–$PP_5$. Like numerals refer to like parts in the various Figures. The multiplexer 60 has five inputs labeled "0", "+1", "−1", "+2" and "−2". The "0" input thereof is connected to a "0" value digital in which all bits thereof are equal to a logic "0". The inputs correspond to the various modified Booth operators that are generated. These inputs are selected by the data that is output on the data bus 74. This data can either be in the form of a digital word, which can be decoded by the multiplexer 60, or it can be five individual lines.

The multiplicand is selected on the data bus 70 labeled TAP B1 and is branched on a two branch data bus 172 for input to the multiplexer 60 on a two branch data bus 174 for input to the multiplexer 50. One branch of the data bus 172 is input to a shifting block on 176 labeled "ASR1" and the other branch is directly input to the multiplexer 60 at the "+2" input of the multiplexer 60 and to the "−2" input thereof through an inverter bank 182. The notation "ASR1" means that the incoming data is shifted right one bit whereas the most significant bit is extended or duplicated one bit.

The output of the shifting block 176 is input directly to the "+1" input of the multiplexer 60 and to the "−1" input thereof through an inverter bank 180. The two branch data bus 174 has one branch thereof input to a shifting block 184 labeled "ASR3" and the other branch thereof input to a shifting block 186 labeled "ASR2". The output of the n shifting block 184 is directly input to the "+1" input of the multiplexer 50 and to the "−1" input thereof through an inverter 188. The output of the shifting block 186 is directly input to the "+2" input of the multiplexer 50 and to the "−2" input thereof through an inverter 190. Selection of the various inputs of the multiplexer 50 is effected by the control signal on the data bus 82.

The output of the address 44 and 106 are fed back to the shifting blocks 54 and 142 which serve to perform an arithmetic right shift of two bits on the incoming. Thus, during the multiplication process, the accumulated sums may be shifted and added to the next partial products. The direct feedback paths corresponding to buses 52 and 144 route the final products as they are required for addition to compute the next Y- and B-values. Shift blocks 184 and 186 serve to shift the first partial product by two bits as well as provide the additional one bit shift, as required by the recode block. Block 176 also provides the one bit shift as required for the remaining partial products. It is important to note that the shifts are relative and that a "+1" or "−1" operation is required, blocks 176 and 184 provide a one bit shift (actually one plus two for block 184) output. When a "+2" or "−2" operation is required, the multiplicand is fed straight through with no shift.

In order to explain the operation of the multiplication circuit of FIGS. 3 and 4, an example of digital multiplication using modified Booth's algorithm is illustrated in Table 3.

TABLE 3

| | | | |
|---|---|---|---|
| | 0.11010110011100 | = 13724 | *2**( −14) |
| | 1.101011001 | = ×(−167) | *2**(−9) |
| $PP_1$ | 000000000011010110011100 | +1 | |
| $PP_2$ | 11111100101001100 1000 | −2 | |
| $PP_3$ | 00000110101100111000 | +2 | |
| $PP_4$ | 000011010110011100 | +1 | |
| $PP_5$ | | | |
| uz,4- | −1 | | |
| /18 | | | |
| 1100- | | | |
| 1010- | | | |
| 01100100 | | | |
| | 11.1011101000001110011100 | = −2291908 | *2**(−23) |
| $PP_1$ | 0000110101100111 00 | +1 | |
| $PP_2$ | 1001010011001000 | −2 | |
| $\Sigma_1$ | 10100010001011 1 | | |
| $\Sigma_1$ | 1110100010001011 1 | | |
| $PP_3$ | 0110101100111000 | +2 | |
| $\Sigma_2$ | 010100111100001 | | |
| $\Sigma_2$ | 00010100111100001 | | |
| $PP_4$ | 0011010110011100 | +1 | |
| $\Sigma_3$ | 010010101000110 | | |
| $\Sigma_3$ | 00010010101000110 | | |
| $PP_5$ | 1100101001100100 | −1 | |
| final product | 1.10111010000011 | | |

In Table 3, the multiplier is a fractional 15-bit data word with a value of "13724*2**(−14)" and the multiplier is a 10-bit data word with a value of "−167*2(−9)". The 10-bit multiplier requires the generation of five partial products which are generated by altering the multiplicand in accordance with the modified Booth operators that are generated. The modified Booth operator generated for $PP_1$ is "+1", "−2" for $PP_2$, "+2" for $PP_3$, "+1" for $PP_4$, and "−1" for $PP_5$. A "+1" indicates the operation whereby the multiplicand is not altered a "−1" requires the two's complement to be generated, a "+2" requires the multiplicand to be shifted by one place to the left and a "−2" requires shifting one place to the left and generation of the two's complement of the multiplicand. Summation of the partial products requires shifting to the left by two places for each sequential partial product. For example, $PP_2$ is shifted to the left two places with respect to $PP_1$ and $PP_3$ is shifted two places to the left with respect to $PP_2$, etc. The shifting of two places to the left is facilitated by shift blocks 54 and 142 which essentially hardwires the data buses 66 and 140** to provide a two bit arithmetic shift.

Multiplication of a fifteen bit number and a ten bit number results in a twenty-five bit product which requires the sign bits to be extended to the left. This requires the sign bit of $PP_1$ to be extended wherein ten zeros are added to the left. In a similar manner, $PP_2$ is extended eight additional sign bits, $PP_3$ is extended six additional sign bits, $PP_4$ is extended four additional sign bits and $PP_5$ is extended two additional sign bits. When the addition is complete, nine of the least significant bits and the most significant sign bit are truncated from the answer such that only a fifteen bit product results, thereby reducing the need for a twenty-five bit output data bus. All of the bit shifting and two's complement generation is facilitated by the shifting circuits and inverter circuits such that the proper partial products can be generated and added to the shifted sum. The first shift between $PP_1$ and $PP_2$ is facilitated by the difference in bit shifting between the shifting blocks 176 and 178 and the shifting blocks 184 and 186. The remainder two bit shift of the Y-adder 44 is facilitated by the shifting block 54 on the summation output.

Figure 5:
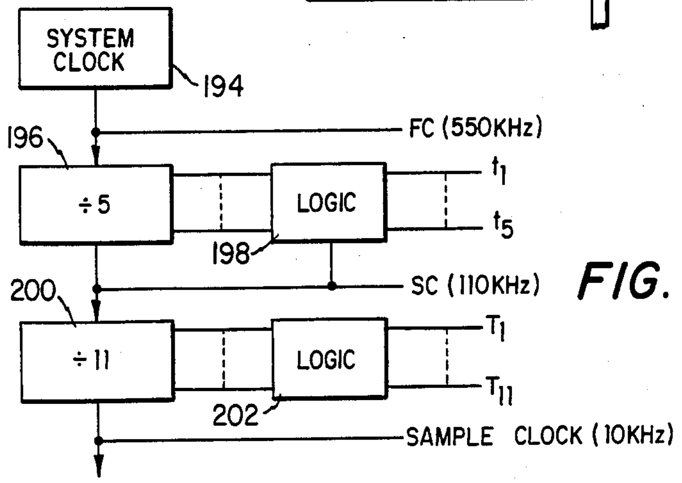
FIG. 5 illustrates a block diagram of the timing circuit for generating the fast and slow timing clocks and the T-times.

Referring now to FIG. 5, there is illustrated a block diagram of the system for generating the clock signals for timing. A system clock 194 is provided for outputting a fast clock signal (FC) of approximately 550 kHz. This system can operate at either a fundamental frequency of 550 kHz or it can be divided down from a higher and more stable operating frequency. The output of a system clock 194 is input to a divide-by-five circuit 196 for generating a slow clock signal (SC) of 110 kHz. A logic circuit 198 is provided that is connected to both the FC and SC signals to divide each period of the slow clock into five segments $t_1$–$t_5$. Each of these time periods $t_1$–$t_5$ is equal in duration to one period of the fast clock or 1.82 microseconds. Each cycle of a slow clock is equal to 8.9 microseconds. The output of the divide-by-five circuit 196 is input to a divide-by-eleven circuit 200 to generate a sample clock operating at a frequency of 10 kHz. The sample clock determines the period of time within which a Y1 value is to be generated after processing the Equations 1–20 in Table 1.

The divide-by-eleven circuit 200 has the counting outputs thereof connected to the input of a logic circuit 202 for generating the T-times $T_1$–$T_{11}$. In addition, a slow clock is also input to the logic circuit 202. Each of the T-times $T_1$–$T_{11}$ are equal in duration to one period of the slow clock frequency or 8.9 microseconds. Therefore, each period of the sample clock is divided into 11 equal segments, each of which has two multiplications and two additions performed therein.

To more clearly demonstrate the data flow through the system of FIG. 1 with the separate calculation of Y- and B-values, the status of all the registers is illustrated in Table 4 as a function of T-times $T_1$–$T_{11}$.

TABLE 4

| Time | | K Stack | | Y Adder | | | Y | Y Adder | | | B | B Stack | | Y1 |
|---|---|---|---|---|---|---|---|---|---|---|---|---|---|---|
| | | Tap | Tap | | | | | | | | | Tap | Tap | |
| T | t | k1 | k2 | A | B | Σ | Reg | A | B | Σ | Reg | B1 | B2 | Reg |
| | 1 | E | k1 | $PP_2$ | $PP_1$ | $Y1_{i-1}$ | $Y1_{i-1}$ | $PP_2$ | $PP_1$ | $b3_{i-1}$ | $b3_{i-1}$ | $-I_i$ | $b1_{i-2}$ | |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | |
| 1 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | |
| | 4 | ″ | ″ | $PP_5$ | $\Sigma_5$ | $\Sigma_5$ | ″ | $PP_5$ | $\Sigma_3$ | $\Sigma_3$ | ″ | ″ | ″ | |
| | 5 | ″ | ″ | 0 | $EI_i$ | $EI_i$ | ″ | $b1_{i-2}$ | $K1Y1_{i-1}$ | $K1Y1_{i-1}$ | ″ | ″ | ″ | |
| | 1 | k10 | E | $PP_2$ | $PP_1$ | $EI_i$ | $EI_i$ | $PP_2$ | $PP_1$ | $b2_{i-1}$ | $b2_{i-1}$ | $b10_{i-1}$ | $I_i$ | $Y1_{i-1}$ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 2 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $EI_i$ | $-k10b10_{i-1}$ | $-k10b10_{i-1}$ | ″ | $I_i$ | $E*EI_i$ | $E*EI_i$ | ″ | ″ | ″ | ″ |
| | 1 | k9 | k10 | $PP_2$ | $PP_1$ | $Y10_i$ | $Y10_i$ | $PP_2$ | $PP_1$ | X | X | $b9_{i-1}$ | $b10_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 3 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y10_i$ | $-k9b9_{i-1}$ | $-k9b9_{i-1}$ | ″ | $b10_i$ | $k10Y10_i$ | $k10Y10_i$ | ″ | ″ | ″ | ″ |
| | 1 | k8 | k9 | $PP_2$ | $PP_1$ | $Y9_i$ | $Y9_i$ | $PP_2$ | $PP_1$ | $b11_i$ | $b11_i$ | $b8_{i-1}$ | $b9_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 4 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y9_i$ | $-k8b8_{i-1}$ | $-K8b8_{i-1}$ | ″ | $b9_i$ | $k9Y9_i$ | $k9Y9_i$ | ″ | ″ | ″ | ″ |
| | 1 | k7 | k8 | $PP_2$ | $PP_1$ | $Y8_i$ | $Y8_i$ | $PP_2$ | $PP_1$ | $b10_i$ | $b10_i$ | $b7_{i-1}$ | $b8_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 5 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y8_i$ | $-k7b7_{i-1}$ | $-k7b7_{i-1}$ | ″ | $b8_i$ | $k8Y8_i$ | $k8Y8_i$ | | | | |
| | 1 | k6 | k7 | $PP_2$ | $PP_1$ | $Y7_i$ | $Y7_i$ | $PP_2$ | $PP_1$ | $b9_i$ | $b9_i$ | $b6_{i-1}$ | $b7_{i-1}$ | |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 6 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y7_i$ | $-k6b6_{i-1}$ | $-k6b6_{i-1}$ | ″ | $b7_i$ | $k7Y7_i$ | $k7Y7_i$ | ″ | ″ | ″ | ″ |
| | 1 | k5 | k6 | $PP_2$ | $PP_1$ | $Y6_i$ | $Y6_i$ | $PP_2$ | $PP_1$ | $b8_i$ | $b8_i$ | $b5_{i-1}$ | $b6_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 7 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y6_i$ | $-k5b5_{i-1}$ | $-k5b5_{i-1}$ | ″ | $b6_i$ | $k6Y6_i$ | $k6Y6_i$ | ″ | ″ | ″ | ″ |
| | 1 | k4 | k5 | $PP_2$ | $PP_1$ | $Y5_i$ | $Y5_i$ | $PP_2$ | $PP_1$ | $b7_i$ | $b7_i$ | $b4_{i-1}$ | $b5_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 8 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 5 | ″ | ″ | $Y5_i$ | $-k4b4_{i-1}$ | $-k4b4_{i-1}$ | ″ | $b5_i$ | $k5Y5_i$ | $k5Y5_i$ | ″ | ″ | ″ | ″ |
| | 1 | k3 | k4 | $PP_2$ | $PP_1$ | $Y4_i$ | $Y4_i$ | $PP_2$ | $PP_1$ | $b6_i$ | $b6_i$ | $b3_{i-1}$ | $b4_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 9 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |
| | 1 | k2 | k3 | $PP_2$ | $PP_1$ | $Y3_i$ | $Y3_i$ | $PP_2$ | $PP_1$ | $b5_i$ | $b5_i$ | $b2_{i-1}$ | $b3_{i-1}$ | ″ |
| | 2 | ″ | ″ | $PP_3$ | $\Sigma_1$ | $\Sigma_1$ | ″ | $PP_3$ | $\Sigma_1$ | $\Sigma_1$ | ″ | ″ | ″ | ″ |
| 10 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | |
| | 4 | ″ | ″ | $PP_5$ | $\Sigma_3$ | $\Sigma_3$ | $PP_5$ | $\Sigma_3$ | $\Sigma_3$ | ″ | ″ | ″ | ″ | ″ |
| | 5 | ″ | ″ | $Y3_i$ | $-k2b2_{i-1}$ | $-k2b2_{i-1}$ | ″ | $b3_i$ | $k3Y3_i$ | $k3y3_i$ | ″ | ″ | ″ | ″ |
| | 1 | k1 | k2 | $PP_2$ | $PP_1$ | $Y2_i$ | $Y2_i$ | $PP_2$ | $PP_1$ | $b4_i$ | $b4_i$ | $b1_{i-1}$ | $b2_{i-1}$ | ″ |
| | 2 | ″ | ″ | $PP_3$ | $\Sigma_1$ | $\Sigma_1$ | $PP_3$ | $\Sigma_1$ | $\Sigma_1$ | ″ | ″ | ″ | ″ | |
| 11 | 3 | ″ | ″ | $PP_4$ | $\Sigma_2$ | $\Sigma_2$ | ″ | $PP_4$ | $\Sigma_2$ | $\Sigma_2$ | ″ | ″ | ″ | ″ |
| | 4 | ″ | ″ | $PP_5$ | $\Sigma_3$ | $\Sigma_3$ | ″ | $PP_5$ | $\Sigma_3$ | $\Sigma_3$ | ″ | ″ | ″ | ″ |

TABLE 4-continued

| Time | | K Stack | | | | | | | | | | B Stack | | |
|---|---|---|---|---|---|---|---|---|---|---|---|---|---|---|
| | | Tap | Tap | Y Adder | | | Y | Y Adder | | | B | Tap | Tap | Y1 |
| T | t | k1 | k2 | A | B | Σ | Reg | A | B | Σ | Reg | B1 | B2 | Reg |
| | 5 | " | " | $Y2_i$ | $-k1b1_{i-1}$ | $-k1b1_{i-1}$ | " | $b2_i$ | $k2Y2_i$ | $k2Y2_i$ | " | " | " | " |

The data at the output of the K-stack 90 and the connected delay register 94 are contained in the columns labeled TAP K1 and TAP K2 and the data at the outputs of the B-stack 118 and the associated delay register 120 are contained in the columns labeled TAP B1 and TAP B2. The summation output from the Y-adder 44 is labeled with the symbol Σ and the output from the B-adder 106 is also labeled Σ.

Since, as described above, the technology utilized to realize the circuitry of FIG. 2 is dynamic NMOS, data does not appear on the output of either of the adders 44 or 106 until the end of the period $t_5$ during any given T-time. Therefore, a sum always appears during $t_1$ and the next successive T-time. Since each T-time involves five different operations, this data must be latched into a latch prior to $t_2$ in a given T-time. This is facilitated by the Y-register 56 associated with the output of the Y-adder 44 and the B-register 116 on the output of the multiplexer 112. Both the holding register 56 and the B-register 116 load inputs are controlled by the time period $t_1$.

As described above, the calculations are carried out in parallel; that is, a Y-value calculation is carried out simultaneously with a B-value calculation. Equation 1 is first performed to provide the value for $Y10_{i-1}$ and this value used in the subsequent T-time for calculating the value of $Y9_i$. After calculation of $Y9_i$ according to Equation 2, the value of $Y9_i$ is utilized in the next T-time to both calculate the value of $b10_i$ with the B-adder 106 in accordance with Equation 11 and also for calculation for the value of $Y8_i$ in accordance with Equation 3 utilizing the Y-adder 44. Therefore, two operations are being performed in a given operation.

Referring further to TABLE 4, the data flow will be described for the entire sample time. In T-time $T_1$, the data in the K-stack 90 and the associated delay register 94 is arranged such that the value of $k_1$ is present on TAP K2 and the value of E is present on the output TAP K1. The Y-adder 44 is configured as a multiplication circuit for the first four periods $t_1$–$t_4$. During this time, the multiplicand is selected from TAP K1 and this is the value of E. The multiplicand is selected from TAP B1 output from the B-stack 118 and this is ordered such that the value is $I_i$. As will be described hereinbelow, this value was input in the prior sample time through the multiplexer 112. The product generated after period $t_4$ is $+EI_i$ which is the product of $-E$ and $-I_i$. As described above, the sign of the multiplier is forced to a negative such the product generated in the multiplication step is a negative product.

After the product has been generated in the time period $t_4$, the multiplexer 46 selects the "0" digital value for input to the A-input of the Y-adder 44. Thus, the value on the summed output of the Y-adder 44 is $EI_i$. As described above, this value does not appear until the end of a given T-time or during the first period $t_1$ in these subsequent T-times. Therefore, the value $EI_i$ appears in the first period $t_1$ in T-time $T_2$.

The operation of the B-adder 106 during T-time $T_1$ is similar to that of the Y-adder 44. For the multiplier, the value of k1 is selected from TAP K2 and the multiplicand is the value of $Y1_{i-1}$ that was on the output of Y-adder 44 during the initial period $t_1$ and latched into the Y-register 56. The product generated is $k1Y1_{i-1}$ which is input to the B-input of the B-adder 106 during the time period $t_5$. During $t_5$, an addition operation is performed wherein the addend is the value of $b1_{i-2}$ selected from the output of the delay register 120 on TAP B2. The result is $b2_{i-1}$, which appears on the output of the B-adder 106 during $T_2$ During $T_2$, the K-stack 90 and the associated delay register 94 are incremented by the slow clock during the transition from $T_1$ to $T_2$ to place the value of E on the output TAP K2 and the value of k10 on the output TAP K1. The B-stack 118 and the associated delay register 120 are also incremented by the slow clock to place the value of $b10_{i-1}$ on TAP B1 and the value of $-I_i$ on TAP B2. The B-adder 106 receives the multiplier value of E from TAP K2 and the multiplicand value of $-I_i$ on the output TAP B2. Therefore, the Y-adder 44 generates the product $k10b10_{i-1}$ and the B-adder 106 generates the product $EEI_i$. This product output by the B-adder 106 is an irrelevant product which is ignored. During the time period $t_5$ during which the addition operation is performed, the multiplexer 46 connects the output of the Y-register 56 to the A-input of the Y-adder 44. The content of the holding register 56 is the previously generated product $EI_i$. This value is loaded into the Y-register 56 during the time period $t_1$ during the initial portion of T-time $T_2$. This value must be added during that time since the first sum of $PP_1$, and $PP_2$ appears at the end of the time period $t_1$. The value of the Y-register 56 is then added with the generated product $-k10b10_{i-1}$ to generate the B-value of $Y10_i$, which is output from the Y-adder 44.

During T-time $T_2$, the value of $b2_{i-1}$ exists on the output of the B-adder 106 during the initial period $t_1$. The multiplexer 112 is controlled to output this value therefrom to the input of the B-register 116. The B-register 116 loads this value therein during the period $t_1$ and places it on the input of the B-stack 118 and holds it there for the periods $t_2$–$t_5$. This is necessary since the output value from the B-adder 106 changes during time periods $t_2$–$t_5$ when the remaining partial products are summed and the addend is summed with the generated product. At the end of T-time $T_2$ however, the value of the $EEI_i$ is generated as an irrelevant value. During this time, the multiplexer 112 is controlled to select the output of the Y1-register 104 in which the value of $Y1_{i-1}$ is stored. This value was stored in the previous sample time after calculation of $Y1_i$ and T-time $T_{11}$. According to Equation 20, this is equated to the value of $b1_{i-1}$.

In the next T-time $T_3$ the K-stack 90 and associated register 94 and the B-stack 118 and associated delay register 120 are incremented by the slow clock to place the next multiplicand and addends at the proper positions in the stacks. The value of $Y9_i$ is generated during $T_3$ on the output of the Y-adder and the value of $b11_i$ is generated on the output of the B-adder 106. Since the value of $b11_i$ does not appear in Equations 1–20 in Table 1, this is also an irrelevant value which does not have to be stored in the B-stack 118. However, it does appear on the output of the B-adder 106 during the time period $t_1$ in T-time $T_4$. During this time period, the multiplexer selects the value of −I for input to the stack 118.

The subsequent values of $Y8_i$–$Y1_i$ and the B-values $b10_i$–$b3_i$ are generated during the remaining T-times $T_4$–$T_{11}$. When the value of $Y1_i$ is generated during $T_{11}$, it is placed into the Y1-register 104 for storage therein.

When a B-value is stored in B-stack 118, it is delayed eight cycles of the slow clock before being output on the output TAP B1 and nine cycles of the slow clock before being output on the output TAP B2. For example, the B-value $b10_i$ is calculated during T-time $T_4$ and appears on the output of the B-adder 106 at the beginning of T-time $T_5$. During the time period t in T-time $T_5$, the value of $b10_i$ is loaded into the latch 116. At the transition between $T_5$ and $T_6$, $b10_i$ is input to the first register in the B-stack 118. Each additional transition between T-times clocks the B-value through the stack 118 until it appears seven clock cycles later on the output TAP B1 during T-time $T_2$. It also appears on the output of TAP B2 during T-time $T_3$.

In summary, there has been provided a system for processing equations for an LPC digital lattice filter. Two full adders are utilized with one adder utilized for calculation of the Y-values and one adder utilized for calculation of the B-values. Each of the full adders is configured to perform the multiplication followed with an addition to the generated product. After the Y-value is calculated, it is utilized by the remaining adder as the multiplicand for calculating the next sequential B-value. The generated Y-value is also utilized in the next subsequent Y-value calculation. Therefore, only one holding register is required to hold a generated Y-value until calculation of the next sequential Y-value. The B-values are delayed for one sample period for use in calculating both subsequent B-values and Y-values. Since Y-values only have to be held for less than one cycle, the amount of storage is reduced. By using two parallel adders, it is only necessary to provide eleven T-times during a given sample time, thereby requiring each adder to generate a Y-value or B-value during 1/11 of a given sample time. For example, at a rate of ten kHz, this requires a 110 kHz clock rate for the T-times. Each adder operates at a rate five times the rate of T-times or a repetition rate or 550 kHz, thus requiring a full adder that propagates carries at a rate of 550 kHz.

Although the preferred embodiment has been described in detail, it should be understood that various changes, substitutions, and alterations can be made therein without departing from the spirit and the scope of the invention is defined by the appended claims.

What is claimed is:

1. A digital lattice filter having n operational stages for calculating Y-values and B-values for a linear predictive coding voice compression technique in accordance with the equations:

$$Y(n)_i = Y(n+1)_i - k(n)b(n)_{i-1}$$

$$b(n+1)_i = b(n)_{i-1} + k(n)Y(n)_i$$

where:

n is the operational stage in which the equation is processed, i is the sample time required to process the equations through the n operational stages, and k is a multiplier constant, there being n multiplier constants, the digital lattice filter comprising:

multiplier storage means for storing the k multiplier constants in a predetermined order;

B-delay means for storing and delaying calculated B-values received in the i sample time for output in the next sample time i+1;

Y-value storage means for storing calculated Y-values $Y(n)_i$ for a given n and a given i sample time for use in subsequent Y-value and B-value calculations as $Y(n+.1)_i$;

Y-value calculation means for receiving a multiplier constant k(n) for a given n from said multiplier storage means, a multiplicand $b(n)_{i-1}$ from said B-delay means and a previously calculated Y-value $Y(n+1)_i$ from said Y-value storage means as an addend and calculating a Y-value $Y(n)_i$ therefrom, the output of said Y-value calculation means stored in said Y-value storage means;

B-value calculation means for receiving a multiplier constant k(n+1) for a given n from said multiplier storage means, a multiplicand $Y(n+1)_i$ from the output of said Y-value calculation means and an addend $b(n+1)_{i-1}$ from said delay means for calculation of a B-value $b(n+2)_i$, the output of said B-value calculation means input to said B-delay means for delay thereof;

said Y- and B-value calculation means simultaneously performing a calculation of $Y(n)_i$ and $b(n+2)_i$ for the given n and the given i sample time;

control means for controlling the operation of the digital lattice filter to sequentially calculate the Y- and B-values for decreasing values of n for a given i sample time and determine the amount of time that calculated B-values stored in said B-delay means in the given i sample time are delayed by said delay means for output in the next i+1 sample time; and latch means for receiving and storing the final y-value $Y(n)_i$ output by said Y-value calculation means for n equal to 1.

2. The digital lattice filter of claim 1 wherein said multiplier storage means comprises a rotary storage register that is controlled by said control means to sequentially output the values of k(n) and k(n+1) for a given n.

3. The digital lattice filter of claim 1 and further comprising means for altering the values of k stored in said multiplier storage means.

4. The digital lattice filter of claim 1 wherein said B-delay means comprises a first-in first-out data register having a predetermined number of stages for delaying values stored therein, calculated B-values stored therein incremented through said stages under the control of said control means for each change in the value of n.

5. The digital lattice filter of claim 1 wherein said Y- and B-value calculating means each comprise a single full adder and means to interface with said full adder to perform an iterative multiplication operation in accordance with a modified Booth's multiplication algorithm on the selected multiplier and multiplicand by generating and summing partial products to generate a product of the multiplier and multiplicand and sequentially add this generated product to the addend to generate the respective Y- or B-value $Y(n)_i$ or $b(n+2)_i$, respectively.

6. The digital lattice filter of claim 1 wherein said control means comprises:

a first clock for determining the duration of the sample time i required for processing one set of Y and B-values to generate the final Y-value $Y(1)_i$—for storage in said latch means; and a second clock synchronized with said first clock for determining the duration of time for each of said Y- and B-value calculating means to calculate the respective Y- or B-values.

7. A digital lattice filter for calculating Y-values and B-values in a linear predictive coding voice compression technique in accordance with the equations:

$$Y(n)_i = Y(n+1)_i - k(n)b(n)_{i-1}$$

$$b(n+1)_i = b(n)_{i-1} + k(n)Y(n)_i$$

where:

n is the operational stage in which the equation is processed, i is the sample time required to process the equations through the n operational stages, and k is a multiplier constant, there being n multiplier constants, the digital lattice filter comprising:

a first-in first-out B-stack for receiving and storing B-values received in the i sample and selectively outputting the stored B-values in the i+1 sample time after a predetermined amount of delay and outputting $b(n)_{i-1}$ and $b(n+1)_{i-1}$ for a given n and a given i sample time;

a rotary data stack for storing the k multiplier constants therein for all values of n and outputting k(n) and k(n+1) for each value of n;

a Y-value register for storing a Y-value $Y(n)_i$ for use in calculation of the next subsequent Y-value as the value $Y(n+1)_i$;

a Y-adder having two inputs for receiving two digital values and generating the sum therefor;

a B-adder having two inputs for receiving two digital values and generating the sum therefor;

Y-switching means interfaced with the two inputs and the output of said Y-adder for controlling the operation thereof to selectively receive a multiplier and multiplicand and perform a multiplication operation by generating and adding partial products in accordance with a predetermined multiplication algorithm to generate a product followed by the addition of a selectively received addend with the generated product to yield the Y-value $Y(n)_i$ for a given n and a given i sample time;

said Y-switching means receiving the multiplier constant k(n) from said rotary data register, the multiplicand $b(n)_{i-1}$—from said B-stack and the addend $Y(n+1)_i$ from said Y-register, the generated Y-value $Y(n)_i$ input to said Y-register after calculation thereof;

B-switching means interfaced with the two inputs and the output of said B-adder for controlling the operation thereof to selectively receive a multiplier and multiplicand and perform a multiplication operation by generating and adding partial products in accordance with a predetermined multiplication algorithm to generate a product followed by the addition of a selectively received addend with the generated product to generate the B-value $b(n+2)_i$ for the given n and the given i sample time on the output of said B-adder;

said B-switching means receiving the multiplier k(n+1) from said rotary stack, the multiplicand $Y(n+1)_i$ from the output of said Y-register and the addend $b(n+1)_{i-1}$ from the output of said B-stack, the generated B-value $b(n+2)_i$ output by said B-adder being input to said B-stack;

said Y- and B-switching means operating simultaneously for a given n to calculate the values $Y(n)_i$ and $b(n+2)_i$ utilizing the value $Y(n+1)_i$;

timing means for decrementing the value of n and controlling the operation of said Y- and B-switching means to select a new multiplicand, multiplier and addend for each new value of n and for controlling said B-stack and said rotary data register to output new values of $b(n)_{i-1}$ and $b(n+1)_{i-1}$, and k(n), respectively, for each value of n; and a latch for seleetively storing the final Y-value $Y(n)_i$ for n equal to one.

8. The digital lattice filter of claim 7 wherein the predetermined multiplication algorithm is a modified Booth's algorithm and each of said Y- and B-switching means comprises:

partial product means for generating partial products of the multiplier and multiplicand;

control interface means for interfacing with the two inputs and the output of the respective one of said Y- and B-adders to successively add and shift the partial products to generate a product according to the modified Booth's algorithm; and feedback means for routing the generated product output by the respective one of said Y- and B-adders back to one input of the respective one of said Y- and B-adders and the addend to the remaining input thereof to generate the respective Y-or B-value.

9. The digital lattice filter of claim 7 and further comprising means for changing the value of the k multiplier constant contained in said rotary register.

10. The digital lattice filter of claim 7 and further comprising means for inputting data from an external source into said B-stack.

11. The digital lattice filter of claim 7 and further comprising means for inputting the data contained in said Y-latch into the input of said B-stack.

12. The digital lattice filter of claim 7 wherein said B-stack is comprised of a first and second section, the first section having a first delay and said second section having a second and longer delay, said first delay for determining the delay of the multiplicand $b(n)_{i-1}$ input to said Y-switching means and said second delay for determining the delay of data for input as the addend $b(n+1)_{i-1}$ to said B-switching means.

13. The digital lattice filter of claim 7 wherein said rotary data register has two taps for supplying data from two separate registers therein as the multiplier k(n) for said Y-switching means and as the multiplier k(n+1) for said B-switching means such that different multipliers can be utilized therefor.

14. A method of cycling a digital lattice filter to calculate Y-values and B-values for a linear predictive coding voice compression technique in accordance with the equations:

$$Y(n)_i = Y(n+1)_i - k(n)\ b(n)_{i-1}$$

$$b(n+1)_i = b(n)_{i-1} + k(n)Y(n)_i$$

where:

n is the operational stage in which the equation is processed, i is the sample time required to process the equations through the n operational stages, and k is a multiplier constant, there being n multiplier constants, comprising:

storing in a temporary register the Y-value $Y(n)_i$ for use in the next sequential calculation of a Y-value as $Y(n+1)_i$;

storing B-values calculated in the $i-1$ sample time and delaying the stored B-values for output in the i sample time as $b(n)_{i-1}$ and $b(n+1)_{i-1}$ for a given n;

storing the multiplier constants k and outputting k(n) as the multiplier for a given n for generation of the Y-value $Y(n)_i$, and $k(n+1)$ as the multiplier for generation of the B-value $b(n+2)_i$;

retrieving the delayed B-value $b(n)_{i-1}$ as a multiplier for calculation of the Y-value $Y(n)_i$;

retrieving the multiplier constant k(n) for calculation of the Y-value $Y(n)_i$;

retrieving the stored Y-value $Y(n+1)_i$ from the temporary register for the addend in the Y-value calculation for $Y(n)_i$;

retrieving the previously calculated Y-value $Y(n+1)_i$ from the temporary storage register as the multiplicand for generating the B-value $b(n+2)_i$;

retrieving the multiplier constant $k(n+1)$ for calculation of the B-value $b(n+2)_i$;

retrieving the delayed B-value $b(n+1)_{i-1}$ as the addend for calculation of the B-value $b(n+2)_i$;

calculation of Y-value $Y(n)_i$ and B-value $b(n+2)_i$ occurring simultaneously;

calculating the Y-value $Y(n)_i$ by multiplying the retrieved multiplier constant k(n) and multiplier $b(n)_{i-1}$ *to generate the product thereof followed by subtraction of the generated product from the addend* $Y(n+1)$;

calculating the B-value $b(n+2)_i$ by multiplying the retrieved multiplier constant $k(n+1)$ and multiplier $Y(n+1)_i$ to generate the product thereof followed by addition of the generated product with the addend $b(n+1)_{i-1}$; and storing the final Y-value for n equal to one in a latch.

15. The method of claim 14 and further comprising storing the multiplier constants k in a rotary data register in a predetermined order and providing a first tap for Y-value calculation to output k(n) and a second tap for B-value calculation to output $k(n+1)$ such that different multiplier constants can be utilized simultaneously.

16. The method of claim 14 wherein the B-values provided as the multiplicand in the Y-value calculation and the B-values provided as the addend in the B-value calculation have two different delay values.

17. The method of claim 14 and further comprising inputting external data into the delay string such that the Y-adder is multiplied to calculate the initial Y-value.

18. The method of claim 14 and further comprising means for equating the final Y-value with the final B-value and inputting the final B-value into a delay string for calculation of B-values.

* * * * *